(12) United States Patent
Yoo et al.

(10) Patent No.: US 11,851,009 B2
(45) Date of Patent: Dec. 26, 2023

(54) EMBLEM FOR STEERING WHEEL

(71) Applicants: HYUNDAI MOTOR COMPANY, Seoul (KR); Kia Corporation, Seoul (KR)

(72) Inventors: Joo Seon Yoo, Suwon-si (KR); Jun Yong Min, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/399,211

(22) Filed: Aug. 11, 2021

(65) Prior Publication Data
US 2022/0194305 A1 Jun. 23, 2022

(30) Foreign Application Priority Data
Dec. 17, 2020 (KR) .......................... 10-2020-0177689

(51) Int. Cl.
*B60R 13/00* (2006.01)

(52) U.S. Cl.
CPC ................................ *B60R 13/005* (2013.01)

(58) Field of Classification Search
CPC .......... B60R 13/005; B60R 21/16; B60Q 3/14
USPC ............................ 296/1.08; 280/728 B, 732
See application file for complete search history.

(56) References Cited

U.S. PATENT DOCUMENTS

| | | | | |
|---|---|---|---|---|
| 5,403,034 A | * | 4/1995 | Gans | ..................... B60R 21/216 |
| | | | | 403/294 |
| 6,692,016 B2 | | 2/2004 | Yokota et al. | |
| 9,458,876 B2 | * | 10/2016 | Morris | ................... F16B 39/284 |
| 9,863,454 B2 | * | 1/2018 | Morris | ..................... B60R 11/00 |
| 9,873,446 B2 | * | 1/2018 | Gardner | ................. B62D 1/046 |
| 10,730,431 B2 | * | 8/2020 | Marc | ........................ B60Q 3/80 |
| 2019/0322211 A1 | * | 10/2019 | Kim | ......................... B60Q 3/80 |

FOREIGN PATENT DOCUMENTS

| | | | |
|---|---|---|---|
| DE | 102009045638 A1 * | 4/2011 | ........... B60R 13/005 |
| JP | 2000-159033 | 6/2000 | |
| JP | 2015-0157506 | 9/2015 | |
| KR | 10-2006-0024972 | 3/2006 | |
| KR | 10-1708241 | 2/2017 | |

* cited by examiner

*Primary Examiner* — Amy R Weisberg
*Assistant Examiner* — Sunsurraye Westbrook
(74) *Attorney, Agent, or Firm* — LEMPIA SUMMERFIELD KATZ LLC

(57) ABSTRACT

The emblem for a steering wheel includes: a rim of the steering wheel; the rim including a coupling groove formed in an outer surface thereof; an emblem bracket coupled into the coupling groove; and an emblem assembly including an emblem body, an emblem logo, and a logo portion formed on the emblem logo, the emblem assembly fastened into the emblem bracket in a state in which the logo portion is exposed from a surface of the emblem body.

20 Claims, 18 Drawing Sheets

EMBLEM FOR STEERING WHEEL

CROSS REFERENCE TO RELATED APPLICATION

The present application claims priority to and the benefit of Korean Patent Application No. 10-2020-0177689, filed on Dec. 17, 2020, the entire contents of which are incorporated herein by reference.

FIELD

The present disclosure relates to an emblem for a steering wheel, the emblem being capable of being firmly fixed to the steering wheel.

BACKGROUND

The statements in this section merely provide background information related to the present disclosure and may not constitute prior art.

In the case of an existing steering wheel with three spokes, an emblem is attached to a spoke located at the 6 o'clock position to provide a seating surface of the spoke.

On the other hand, in the case of a steering wheel with four spokes, an emblem is attached on the rim of the steering wheel because no spokes exist at the 6 o'clock position. To this end, the cross-section of the rim to which the emblem is attached is changed to a flat cross-section, and the emblem is attached on the flat cross-section.

However, the attached emblem is removable by hand.

Thus, we have discovered that an emblem structure capable of being firmly fixed to a steering wheel while maintaining unity in terms of design shape is desired.

The foregoing is intended merely to aid in the understanding of the background of the present disclosure, and is not intended to mean that the present disclosure falls within the purview of the related art that is already known to those skilled in the art.

SUMMARY

The present disclosure provides an emblem for a steering wheel, the emblem being capable of being firmly fixed to the steering wheel.

According to one aspect of the present disclosure, provided is an emblem for a steering wheel, the emblem including: a rim of the steering wheel, the rim including a coupling groove formed in an outer surface thereof; an emblem bracket coupled into the coupling groove; and an emblem assembly fastened into the emblem bracket by being coupled thereto in a state in which a logo portion formed on an emblem logo is exposed from a surface of the emblem body.

The rim may include an armature provided therein, and a grip body formed in a shape surrounding the armature; the coupling groove may be formed in the grip body; and a portion of the armature corresponding to the coupling groove may be formed in a cut-out groove shape to provide a space for allowing the coupling groove to be located therein.

A bracket stopper may be formed to protrude from an outer surface of the emblem bracket; and a bracket stopping recess may be formed in an inner surface of the coupling groove at a position corresponding to the bracket stopper, so that the bracket stopper may be coupled to the bracket stopping recess.

A first stopping recess may be formed on a first side of the inner surface of the coupling groove, and a first stopper may be formed on a side surface of the emblem bracket, so that the first stopper may be coupled to the first stopping recess; and a second stopping recess may be formed on a second side of the inner surface of the coupling groove, and a second stopper may be formed on a bottom surface of the emblem bracket, so that the second stopper may be coupled to the second stopping recess, wherein the first stopper and the second stopper may have a height difference therebetween.

A center support may be famed to protrude from a center of the coupling groove; a center hole may be famed at a center of the emblem bracket to be fitted over the center support; and a support protrusion may be formed on an inner surface of the center hole to be supported on an outer surface of the center support.

The emblem logo may be coupled to the emblem body on a rear surface of the emblem body by a hook coupling structure; a logo insertion hole may be famed in the emblem body; and the logo portion may be embossed on the emblem logo, so that the logo portion may be inserted into the logo insertion hole to be exposed from the surface of the emblem body.

A fusion hole may be formed on an edge of the emblem logo; and a fusion protrusion may be formed on the emblem body at a position corresponding to the fusion hole, so that the fusion protrusion may be fused and joined in the fusion hole.

The hook coupling structure may include: a logo stopper formed on each side of the emblem logo; and a body hook formed on each side of the emblem body, so that the respective body hooks may be hooked and coupled to the respective logo stoppers.

The hook coupling structure may include: a logo hooking hole formed on each side of the emblem logo; and a body hook formed on each side of the emblem body, so that the respective body hooks may be hooked and coupled to the respective logo hooking holes.

A double-sided tape may be adhered between a front surface of the emblem logo except for the logo portion and the rear surface of the emblem body.

The emblem logo may be coupled to the emblem body by a hook coupling structure; a logo insertion recess may be famed in the emblem body; and the emblem logo may be inserted into the logo insertion recess to be exposed from the surface of the emblem body.

The hook coupling structure may include: a logo hook formed on each side of a rear surface of the emblem logo; and a body hooking hole formed on each side of the logo insertion recess, so that the respective logo hooks are hooked and coupled to the respective body hooking holes.

A double-sided tape may be adhered between a rear surface of the emblem logo and the logo insertion recess.

A logo insertion recess may be formed in a front surface of the emblem body; the emblem logo may be inserted into the logo insertion recess; and a double-sided tape may be adhered between the emblem logo and the logo insertion recess.

A center support may be famed to protrude from a center of the coupling groove; a center hooking hole may be formed at a center of the center support; and a center hook may be formed on a rear surface of the emblem assembly, so that the center hook may be coupled to the center hooking hole.

The center hook may be formed on the emblem logo or the emblem body.

The center hook may have opposite portions formed in a serrated shape.

A bracket hook may be formed on each side of an inner surface of the emblem bracket; and a side hook may be formed on each side of a rear surface of the emblem body to be hooked and coupled to the bracket hook.

An edge of a surface of the emblem body may match an edge of the coupling groove.

As can be seen from the above solutions, the present disclosure has the following effects. By coupling the emblem bracket to the steering wheel, and by coupling the emblem assembly in which the emblem logo and the emblem body are coupled into the emblem bracket, the emblem can be firmly fixed to the steering wheel. Thus, it is possible to provide robustness of an emblem fixing structure by improving coupling force of the emblem, thereby inhibiting the emblem from being separated, as well as reducing movement of the emblem to improve quality of an emblem product.

In addition, by configuring the emblem assembly to have a two-piece structure of the emblem logo and the emblem body, it is possible to change the logo's color or design only by replacing the emblem logo, thereby providing the degree of freedom in terms of logo design.

In addition, by fixing the emblem to the curved steering wheel, it is possible to provide a sense of unity between an end surface of the grip body and an outer surface of the emblem, while forming a natural parting line along the edge of the emblem.

DRAWINGS

In order that the disclosure may be well understood, there will now be described various forms thereof, given by way of example, reference being made to the accompanying drawings, in which.

Figure 1:
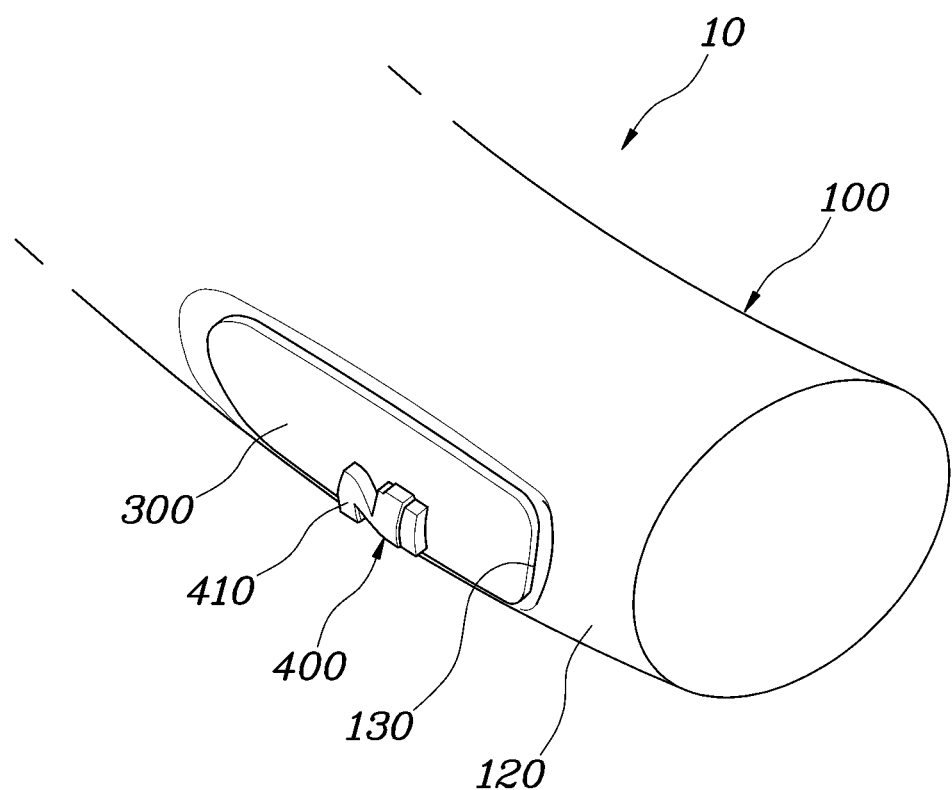
FIG. 1 is a view illustrating a state in which an emblem is coupled to a steering wheel according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinbelow, an exemplary form of the present disclosure will be described in detail with reference to the accompanying drawings. Throughout the drawings, the same reference numerals will refer to the same or like parts.

Figure 2:
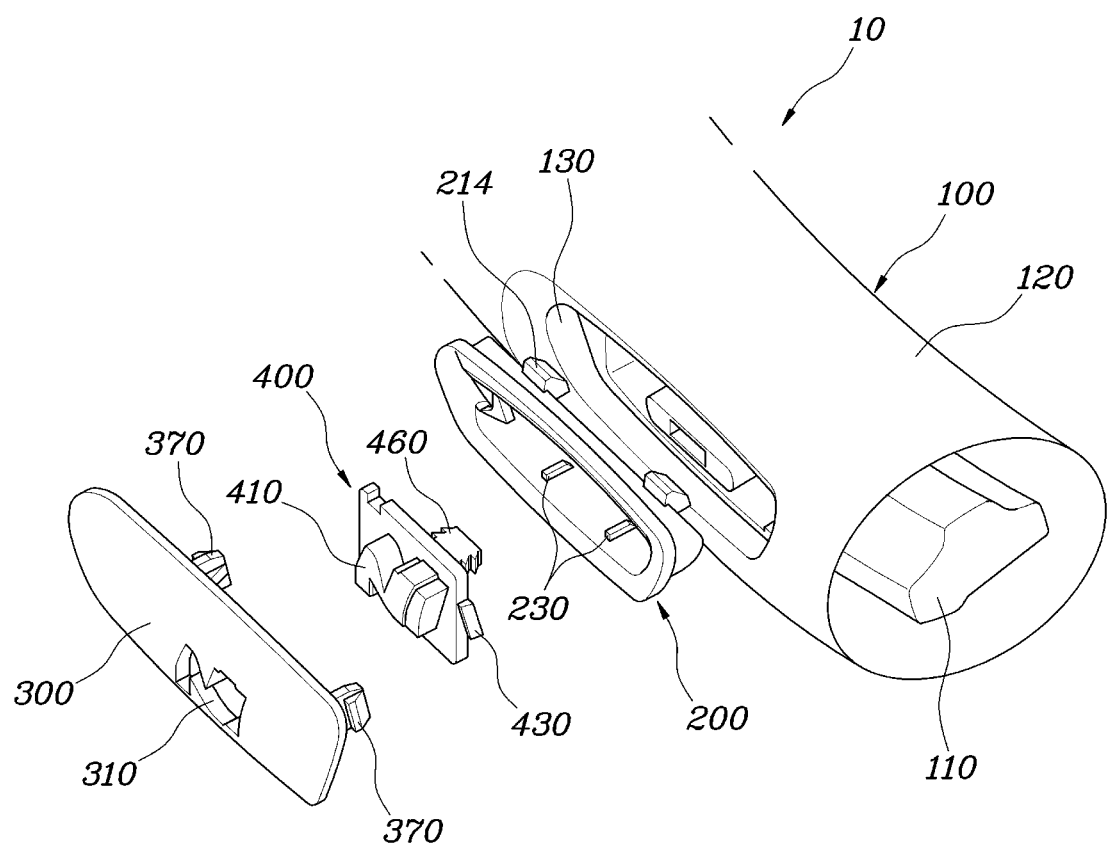
FIG. 2 is an exploded view illustrating components applied to coupling of the emblem according to one form of the present disclosure.
Figure 3:
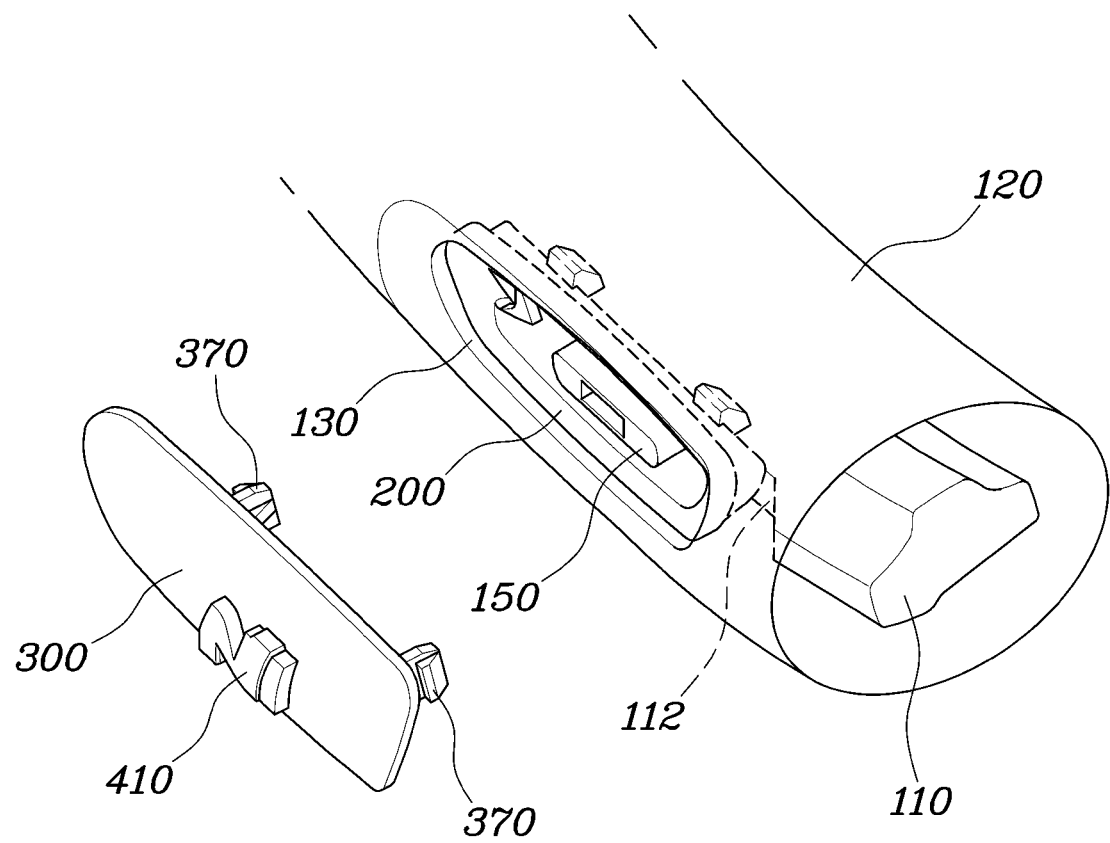
FIG. 3 is a view illustrating a state before an emblem assembly according to one form of the present disclosure is assembled.

FIG. 1 is a view illustrating a state in which an emblem is coupled to a steering wheel 10 according to one form of the present disclosure, FIG. 2 is an exploded view illustrating components applied to coupling of the emblem according to one form of the present disclosure, and FIG. 3 is a view illustrating a state before an emblem assembly according to one form of the present disclosure is assembled.

Referring to the drawings, the present disclosure includes a rim 100 of the steering wheel 10, the rim having a coupling groove 130 formed in an outer surface thereof; an emblem bracket 200 coupled into the coupling groove 130; and an emblem assembly fastened into the emblem bracket 200 by being coupled thereto in a state in which a logo portion 410 formed on an emblem logo 400 is exposed from the surface of the emblem body 300.

For example, the emblem according to one form of the present disclosure is an emblem that can be fixed to the steering wheel 10 having four spokes, and the emblem is fixed at the center of the rim 100 located at a 6 o'clock position.

Further, the emblem is fixed so that a seating surface direction thereof is oriented toward a head of a passenger seated in a driver's seat, so as to provide visibility of the emblem.

Specifically, the coupling groove 130 is formed along a circumferential direction of the steering wheel 10 at the 6 o'clock position of the rim 100 so that the emblem is fixed to the steering wheel 10, and the emblem bracket 200 is inserted and coupled into the coupling groove 130. The emblem bracket 200 is formed by injection-molding a plastic material.

Further, the emblem logo 400 and the emblem body 300 are coupled to each other to form the emblem assembly, and the emblem assembly is inserted and coupled into the emblem bracket 200 to fix the emblem assembly to the steering wheel 10.

That is, in the present disclosure, by fixing the emblem bracket 200 configured separately to the rim 100 and by coupling the emblem assembly to the emblem bracket 200, it is possible to provide robustness of an emblem fixing structure through improvement in coupling force of the emblem, and to reduce an emblem package through simplification of the fixing structure.

In addition, by coupling the emblem logo 400 to the emblem body 300 to form the emblem assembly, it is possible to provide freedom in terms of designing the logo.

Figure 4:
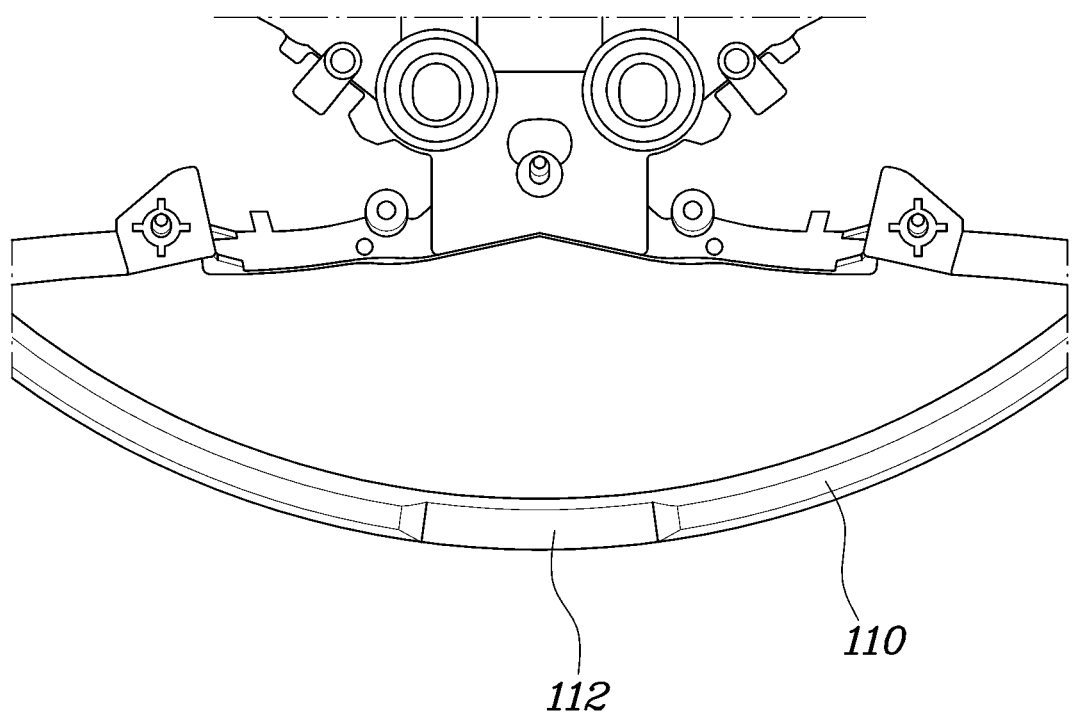
FIG. 4 is a view illustrating the shape of an armature built into a rim according to one form of the present disclosure.

FIG. 4 is a view illustrating the shape of an armature 110 built into the rim 100 according to one form of the present disclosure.

Referring to the drawings, the rim 100 includes the armature 110 provided therein, and a grip body 120 formed in a shape surrounding the armature 110.

Further, the coupling groove 130 is formed in the grip body 120; and a portion of the armature 110 corresponding to the coupling groove 130 is formed in a cut-out groove shape to provide a space for allowing the coupling groove 130 to be located therein.

For example, in order to provide robustness of the steering wheel 10, the armature 110 is provided inside the rim 100, and the grip body 120 is formed by form-molding polyurethane to have a structure surrounding the armature 110.

Particularly, as the coupling groove 130 is formed in the grip body 120, in order to provide a space for forming the coupling groove 130, a portion of the armature 110 facing the coupling groove 130 is cut out by the length of the coupling groove 130 to form a planar-shaped cut-out groove portion 112.

Figure 5:
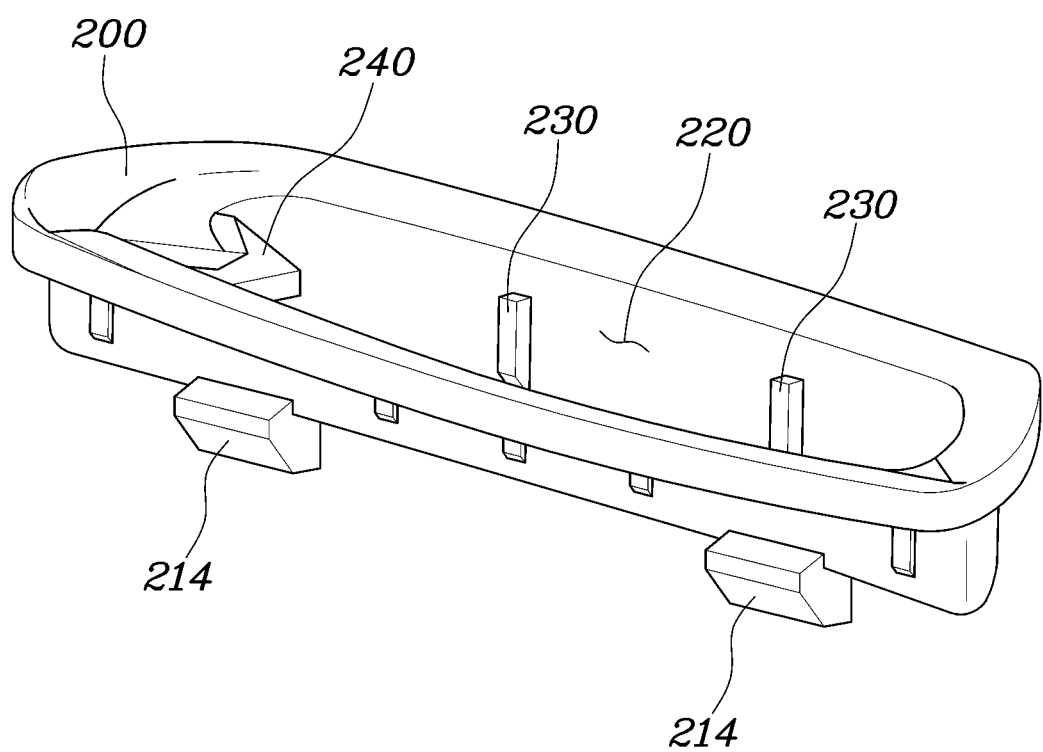
FIG. 5 is a perspective view illustrating an emblem bracket according to one form of the present disclosure.
Figure 6:
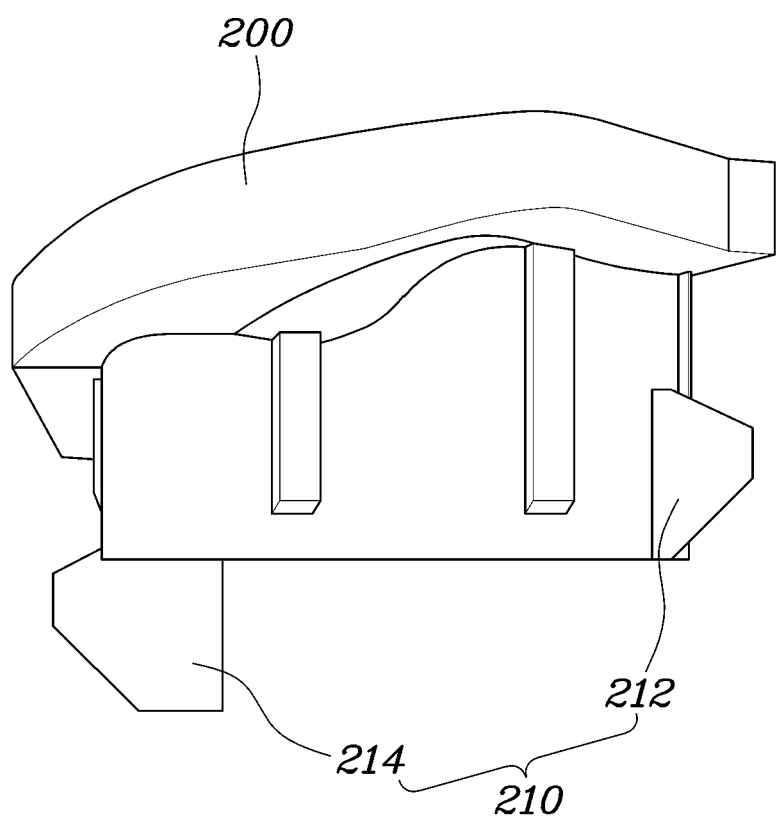
FIG. 6 is a side view illustrating the emblem bracket according to one form of the present disclosure.
Figure 7:
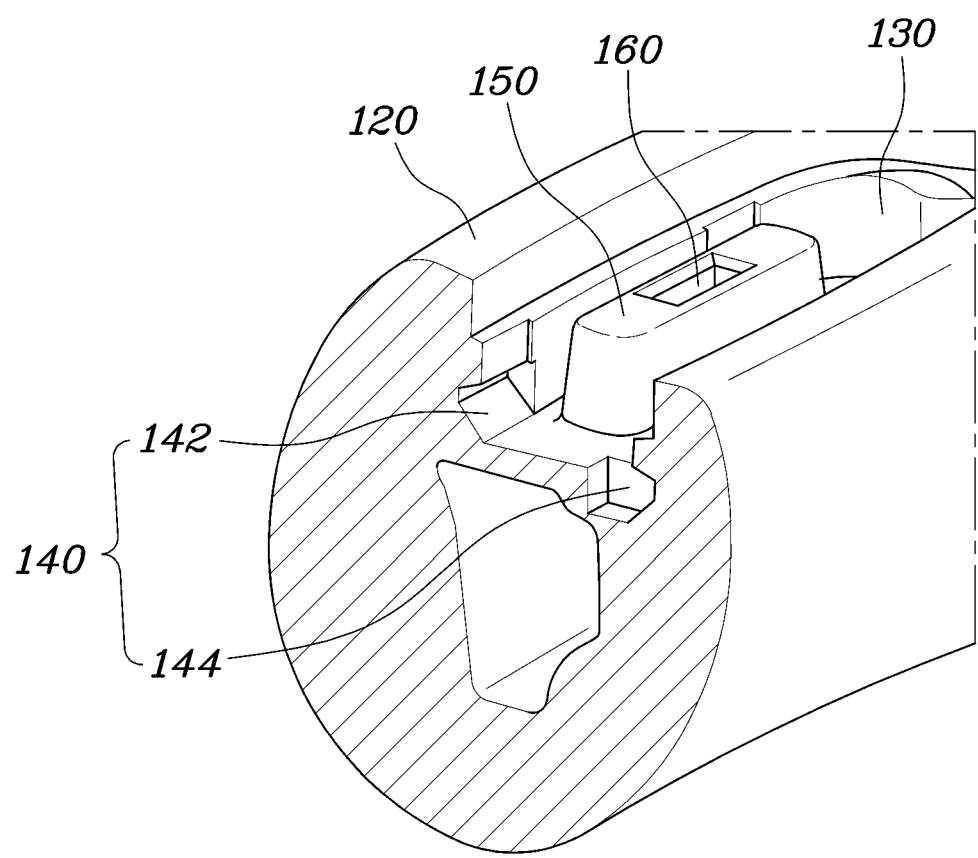
FIG. 7 is a cutaway view illustrating a coupling groove formed in a grip body according to one form of the present disclosure.

In addition, FIG. 5 is a perspective view illustrating the emblem bracket 200 according to one form of the present disclosure, FIG. 6 is a side view illustrating the emblem bracket 200 according to one form of the present disclosure, and FIG. 7 is a cutaway view illustrating the coupling groove 130 formed in the grip body 120 according to one form of the present disclosure.

Referring to the drawings, a bracket stopper 210 is formed to protrude from an outer surface of the emblem bracket 200; and a bracket stopping recess 140 is formed in an inner surface of the coupling groove 130 at a position corresponding to the bracket stopper 210, so that the bracket stopper 210 is coupled to the bracket stopping recess 140.

That is, the bracket stopper 210 formed on the emblem bracket 200 is fitted and coupled into the bracket stopping recess 140 formed in the coupling groove 130, so that the emblem bracket 200 can be firmly coupled into the grip body 120.

Referring to FIGS. 6 and 7, the bracket stopper 210 includes a first stopper 212 and a second stopper 214, and the bracket stopping recess 140 includes a first stopping recess 142 and a second stopping recess 144.

Specifically, the first stopping recess 142 is formed on a first side of the inner surface of the coupling groove 130, and the first stopper 212 is formed on a side surface of the emblem bracket 200, so that the first stopper 212 is coupled to the first stopping recess 142.

Further, the second stopping recess 144 is formed on a second side of the inner surface of the coupling groove 130, and the second stopper 214 is formed on a bottom surface of the emblem bracket 200, so that the second stopper 214 is coupled to the second stopping recess 144. Here, the first stopper 212 and the second stopper 214 have a height difference therebetween.

That is, on the inner surface of the coupling groove 130, the first stopping recess 142 is formed toward an inner radial direction of the rim 100, and the second stopping recess 144 is formed toward an outer radial direction of the rim 100.

Further, the first stopper 212 is formed on a first side of a lower end of the emblem bracket 200 and the second stopper 214 is formed on a second side thereof, so that the first stopper 212 and the second stopper 214 are fitted and coupled into the first stopping recess 142 and the second stopping recess 144, respectively.

Figure 8:
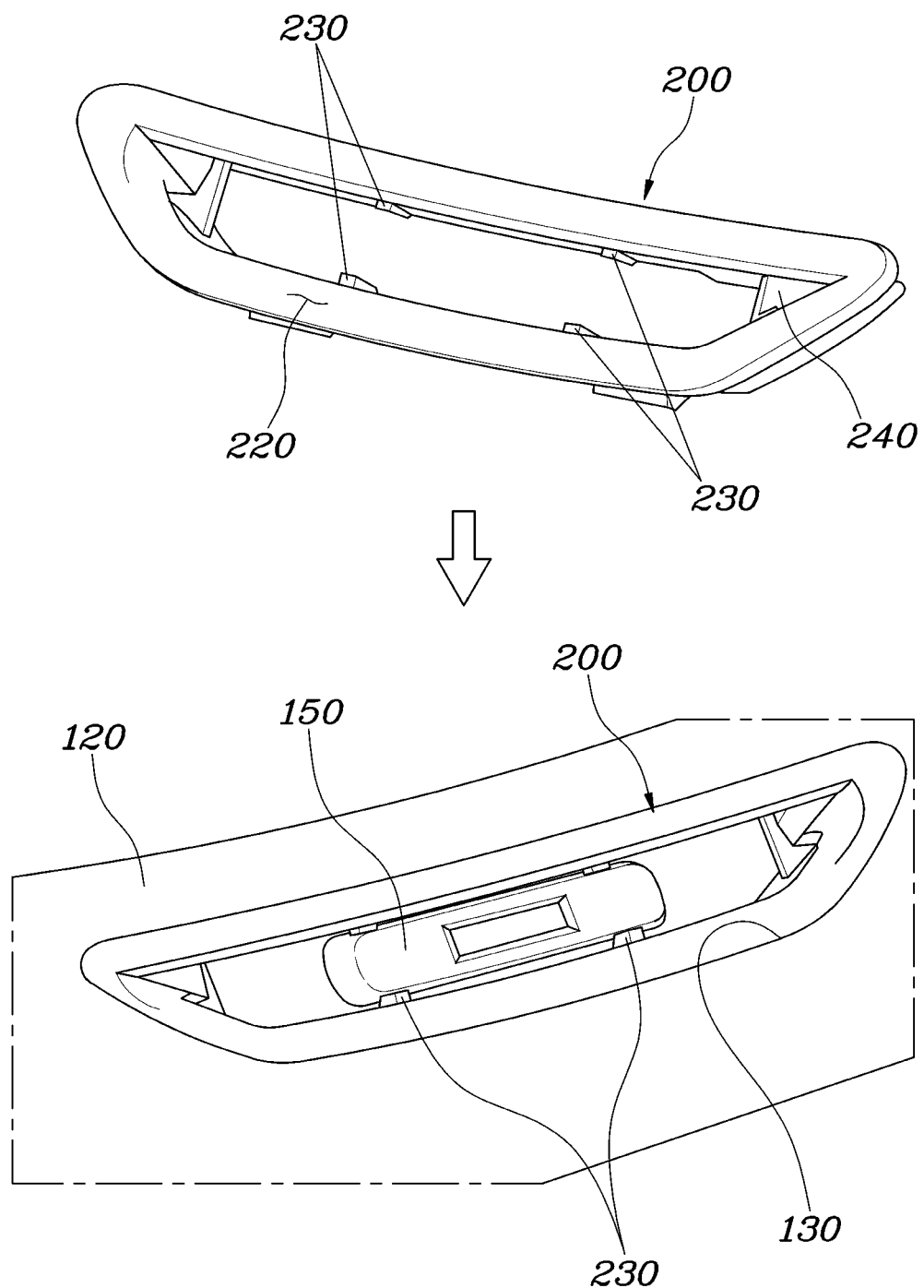
FIG. 8 is a view illustrating a state before and after the emblem bracket according to one form of the present disclosure is coupled to the coupling groove.

In addition, FIG. 8 is a view illustrating a state before and after the emblem bracket 200 according to one form of the present disclosure is coupled to the coupling groove 130.

Referring to the drawings, a center support 150 is formed to protrude from the center of the coupling groove 130; a center hole 220 is formed at the center of the emblem bracket 200 to be fitted over the center support 150; and a support protrusion 230 is formed on an inner surface of the center hole 220 to be supported on an outer surface of the center support 150.

That is, when the emblem bracket 200 is inserted into the coupling groove 130, the center hole 220 is fitted over the center support 150, and in this process, the support protrusion 130 formed on the inner surface of the center hole 220 is supported on the outer surface of the center support 150.

Thus, it is possible to improve coupling force of the emblem bracket 200 fitted into the coupling groove 130, and to inhibit undesired small movement of the emblem bracket 200 from occurring.

Figure 9:
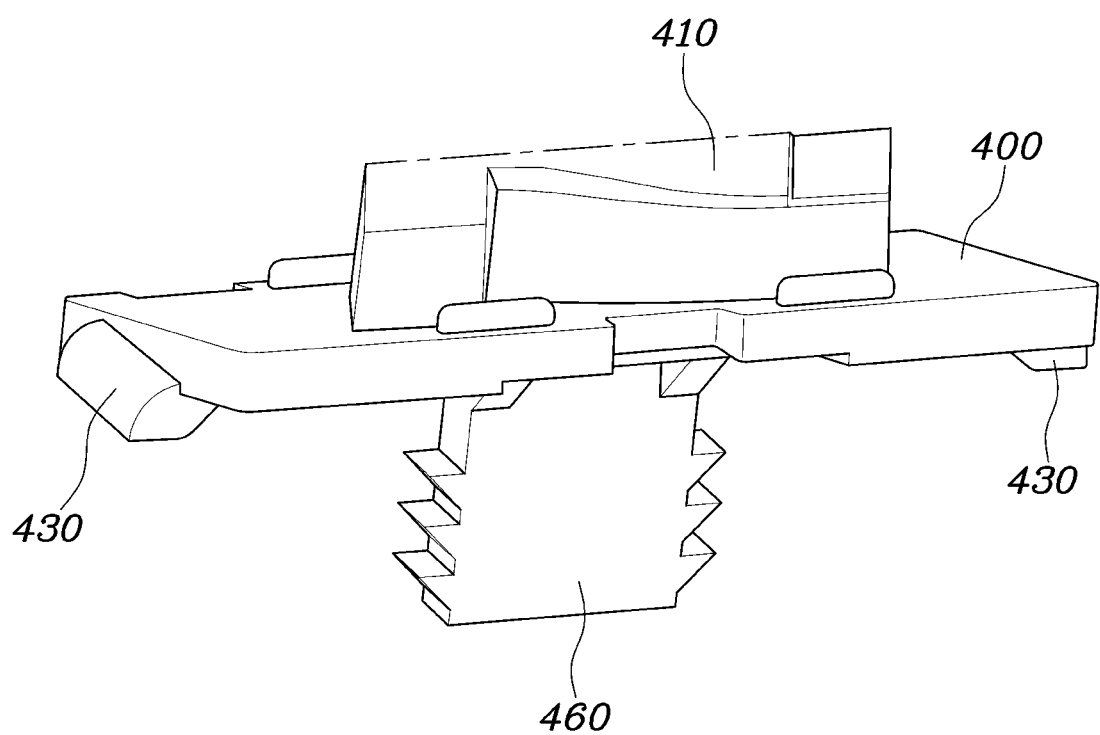
FIG. 9 is a perspective view illustrating an emblem logo according to a first form of an emblem assembly according to the present disclosure.
Figure 10:
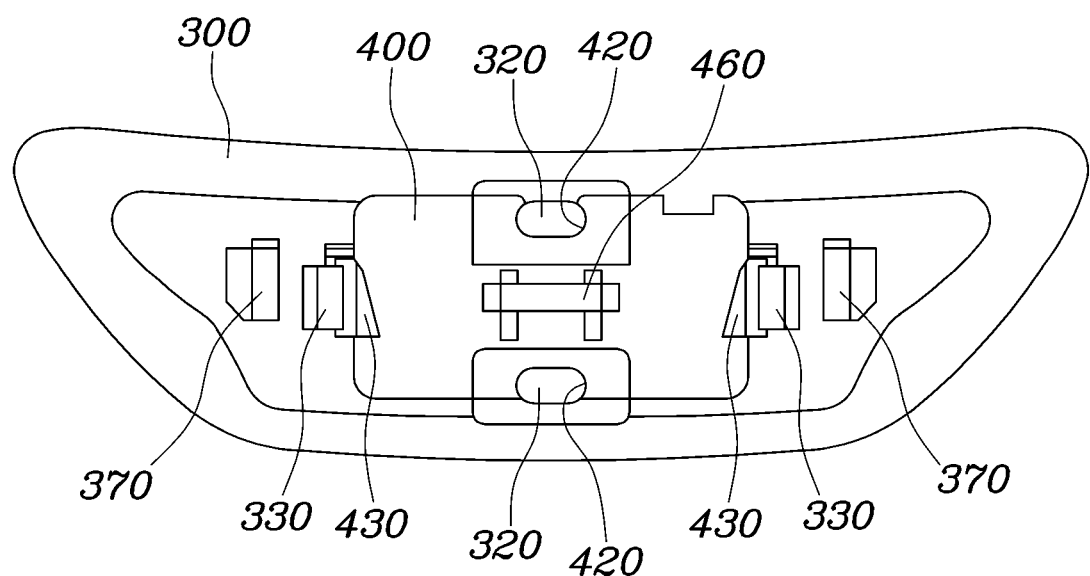
FIG. 10 is a view illustrating the rear shape of the emblem assembly illustrated in FIG. 9.

Meanwhile, FIG. 9 is a perspective view illustrating an emblem logo 400 according to a first form of an emblem assembly according to the present disclosure, and FIG. 10 is a view illustrating the rear shape of the emblem assembly illustrated in FIG. 9.

Referring to FIGS. 9 and 10 in conjunction with FIG. 2, the emblem logo 400 is coupled to an emblem body 300 on a rear surface of the emblem body 300 by a hook coupling structure; a logo insertion hole 310 is formed in the emblem body 300; and a logo portion 410 is embossed on the emblem logo 400, so that the logo portion 410 is inserted into the logo insertion hole 310 to be exposed from the surface of the emblem body 300.

For example, the logo insertion hole 310 is formed at the center of the emblem body 300, and the logo portion 410 is embossed at the center of a surface of the emblem logo 400 facing the emblem body 300 in a shape corresponding to the logo insertion hole 310. Further, the logo portion 410 is inserted into the logo insertion hole 310 in a shape passing therethrough, so that the logo portion 410 is exposed from the surface of the emblem body 300 through the logo insertion hole 310.

Figure 11:
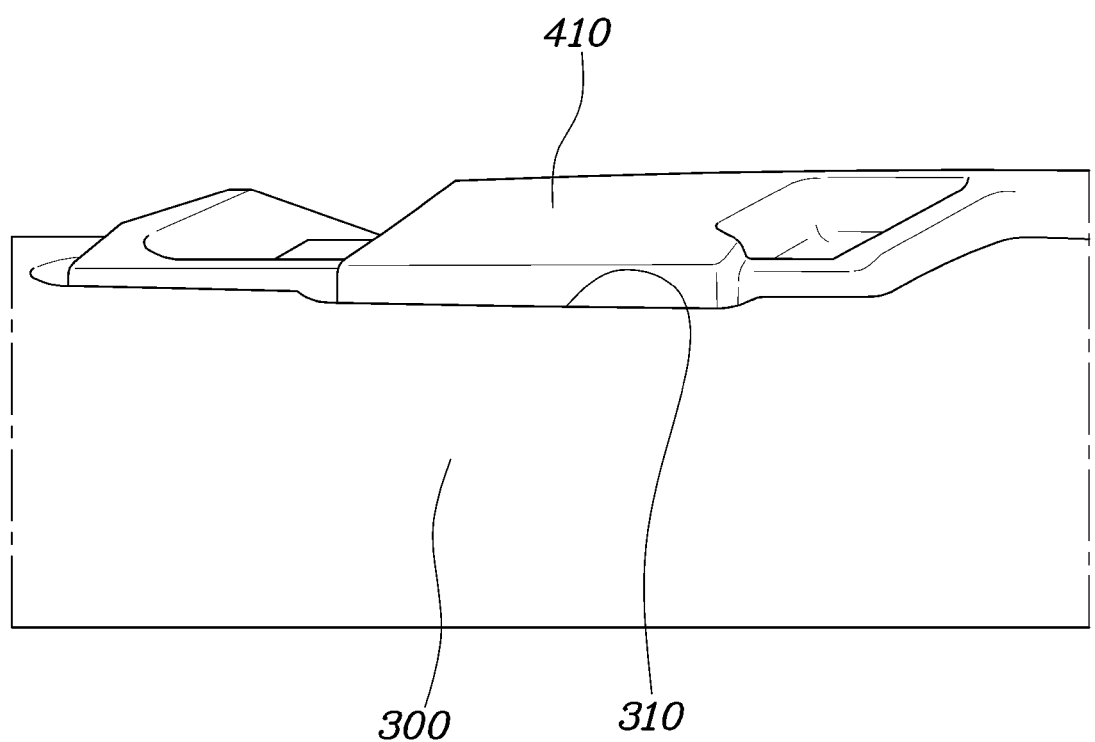
FIG. 11 is a view illustrating the amount of protrusion of the emblem logo according to one form of the present disclosure.

However, as illustrated in FIG. 11, the logo portion 410 is configured to protrude finely from the logo insertion hole 310 to a height of less than 0.3 mm so that a passenger is free from feeling any discomfort associated with the logo portion 410 when steering the steering wheel 10.

As such, by forming the logo portion 410 on the emblem logo 400 and by coupling the emblem logo 400 to the emblem body 300 to form the emblem, it is possible to change the logo's color or design only by replacing the emblem logo 400, thereby providing the degree of freedom in terms of logo design.

Figure 12:
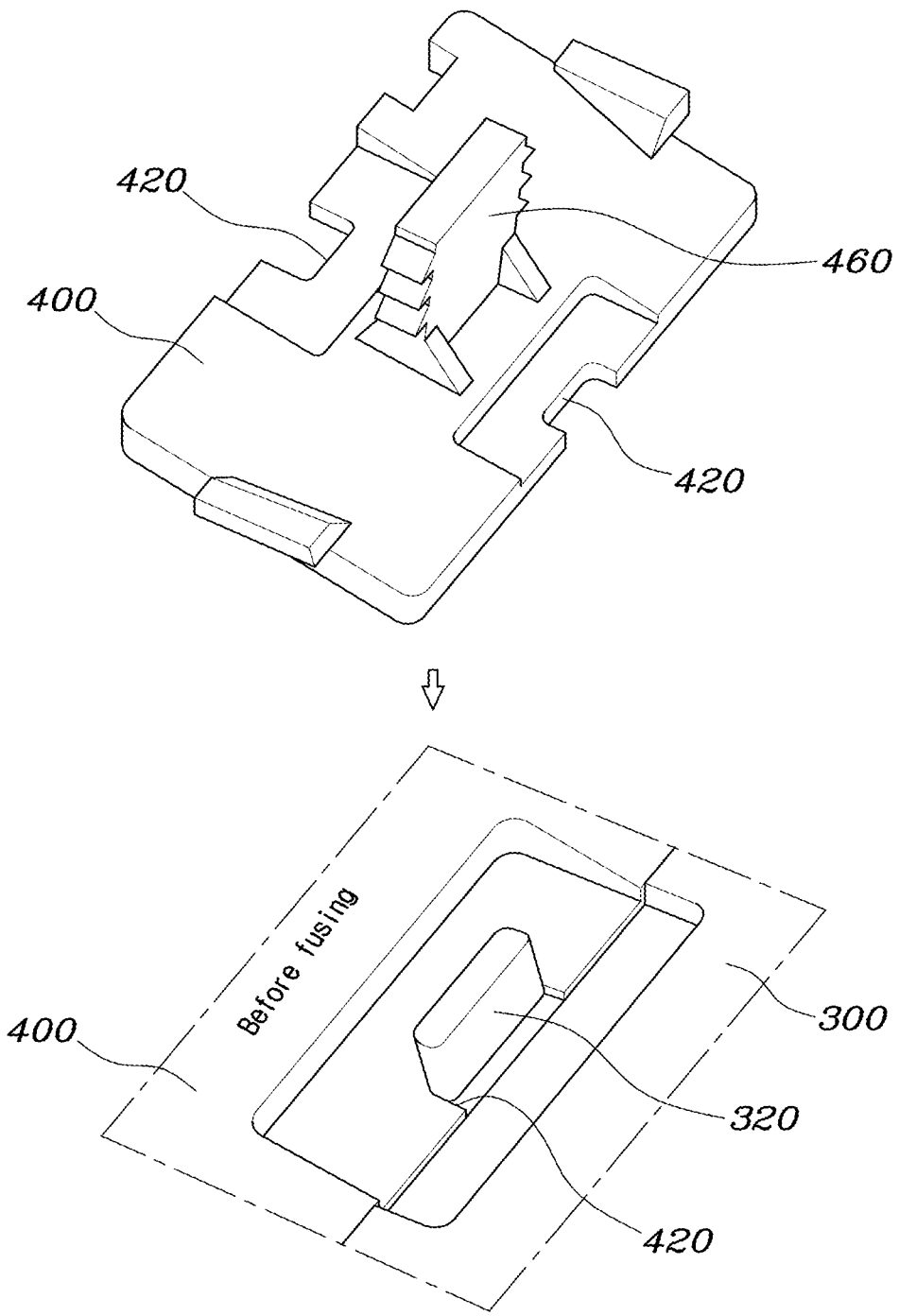
FIG. 12 is a view illustrating a structure in which the emblem logo illustrated in FIG. 9 is joined to an emblem body by fusing.

FIG. 12 is a view illustrating a structure in which the emblem logo 400 illustrated in FIG. 9 is joined to the emblem body 300 by fusing.

Referring to the drawings, a fusion hole 420 is formed on the edge of the emblem logo 400; and a fusion protrusion 320 is formed on the emblem body 300 at a position corresponding to the fusion hole 420, so that the fusion protrusion 320 is fused and joined in the fusion hole 420.

For example, a 'U'-shaped fusion hole 420 is formed at the center of each of upper and lower edges of the emblem logo 400, and fusion protrusions 320 are formed on a rear surface of the emblem body 300 at positions corresponding to the respective fusion holes 420 and are inserted into the fusion holes 420. Thus, when the fusion protrusions 320 are thermally fused, the fusion protrusions 320 are melted and joined to the edges of the fusion holes 420.

In addition, the hook coupling structure will be described in detail with reference to FIGS. 9 and 10. The hook coupling structure includes a logo stopper 430 formed on each side of the emblem logo 400; and a body hook 330 famed on each side of the emblem body 300, so that the respective body hooks 330 are hooked and coupled to the respective logo stoppers 430.

That is, the body hooks 330 are formed in a hook shape on opposite sides of the rear surface of the emblem body 300, and the emblem logo 400 is located between the opposite body hooks 330, so that the logo stoppers 430 on opposite sides of the emblem logo 400 are respectively hooked and coupled to the body hooks 330, thereby coupling the emblem logo 400 to the emblem body 300.

As such, by fixing the emblem logo 400 and the emblem body 300 through fusing by the fusion protrusions 320 as well as the hook coupling structure described above, it is possible to further improve coupling force between the emblem logo 400 and the emblem body 300.

Figure 13:
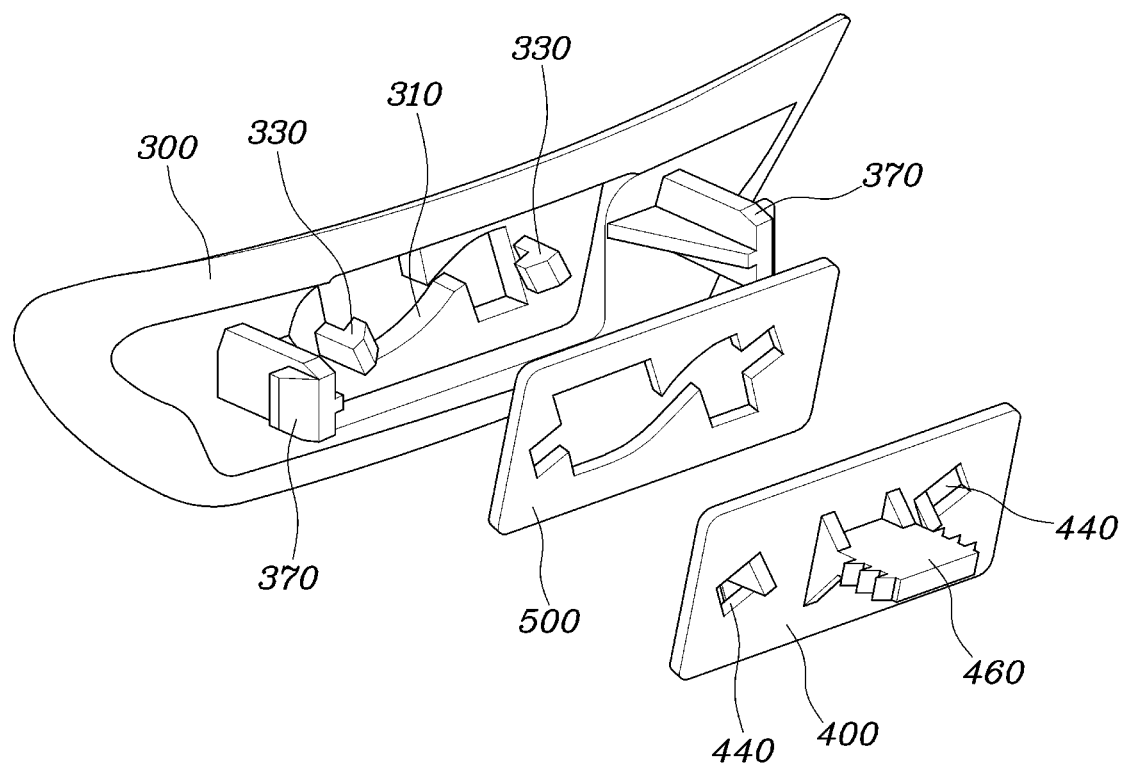
FIG. 13 is an exploded view illustrating an emblem logo and an emblem body according to a second form of an emblem assembly according to the present disclosure.
Figure 14:
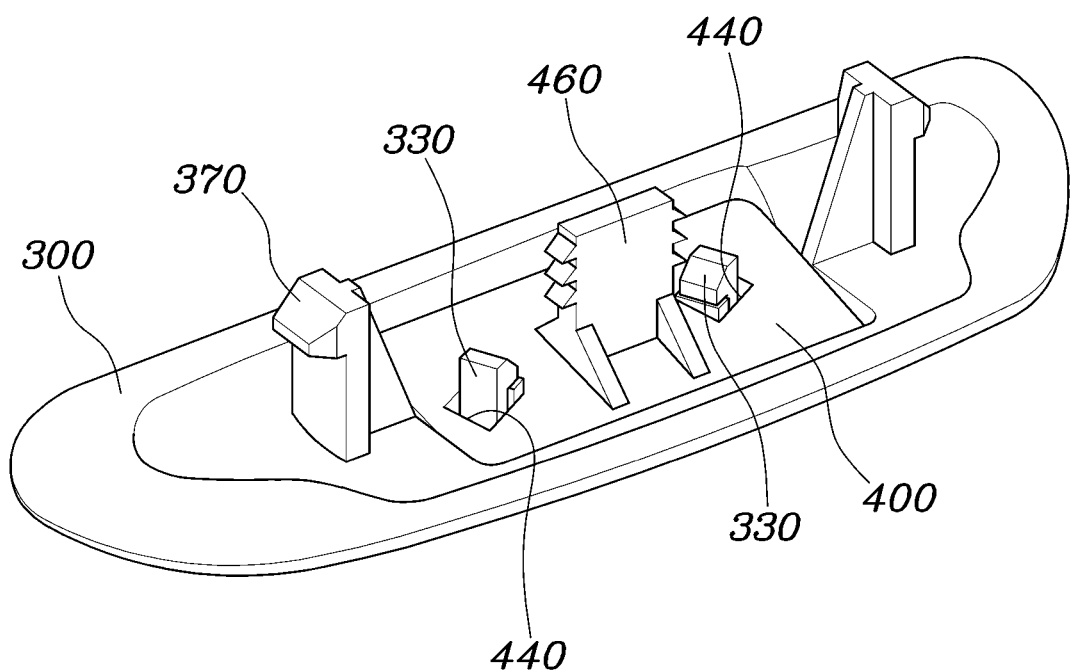
FIG. 14 is a view illustrating the rear shape of the emblem assembly illustrated in FIG. 13.

Meanwhile, FIG. 13 is an exploded view illustrating an emblem logo 400 and an emblem body 300 according to a second form of an emblem assembly according to the present disclosure, and FIG. 14 is a view illustrating the rear shape of the emblem assembly illustrated in FIG. 13.

With reference to the drawings, a hook coupling structure applied to the second form of the emblem assembly will be described. The hook coupling structure includes a logo hooking hole 440 formed on each side of the emblem logo 400; and a body hook 330 formed on each side of the emblem body 300, so that the respective body hooks 330 are hooked and coupled to the respective logo hooking holes 440.

That is, the body hooks 330 are formed in a hook shape on opposite sides of a rear surface of the emblem body 300, and the logo hooking holes 440 are formed on opposite sides of the emblem logo 400 at positions corresponding to the body hooks 330, so that the body hooks 330 are respectively hooked and coupled to the logo hooking holes 440 by being inserted thereinto, thereby coupling the emblem logo 400 to the emblem body 300.

In addition, a double-sided tape 500 may be adhered between a front surface of the emblem logo 400 except for a logo portion 410 and the rear surface of the emblem body 300.

Preferably, the edge of the double-sided tape 500 is formed in a size corresponding to that of the emblem logo 400, and the center of the double-sided tape 500 is formed in a cut-out shape to allow the logo portion 410 and the body hooks 330 to be inserted into the cut-out center.

Thus, a front surface of the double-sided tape 500 is adhered to the rear surface of the emblem body 300, and a rear surface of the double-sided tape 500 is adhered to the front surface of the emblem logo 400, so that the emblem body 300 and the emblem logo 400 are adhered to each other, and in particular, it is possible to further improve coupling force therebetween in conjunction with the hook coupling structure.

Figure 15:
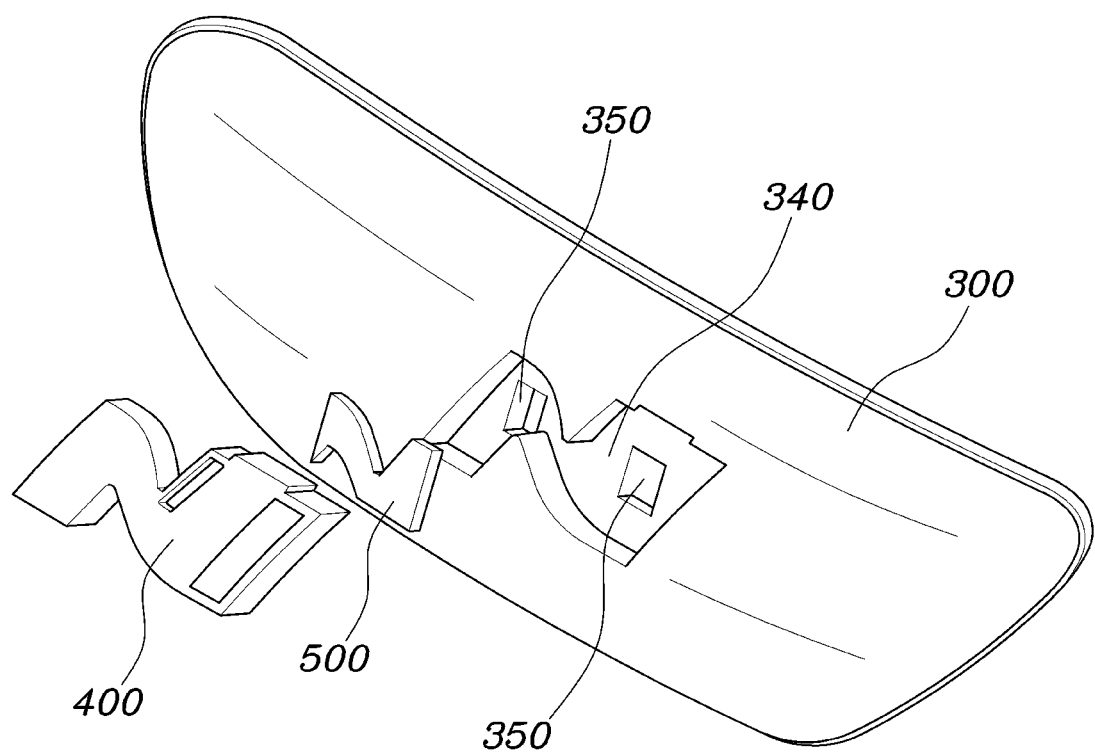
FIG. 15 is an exploded view illustrating an emblem logo and an emblem body according to a third form of an emblem assembly according to the present disclosure.
Figure 16:
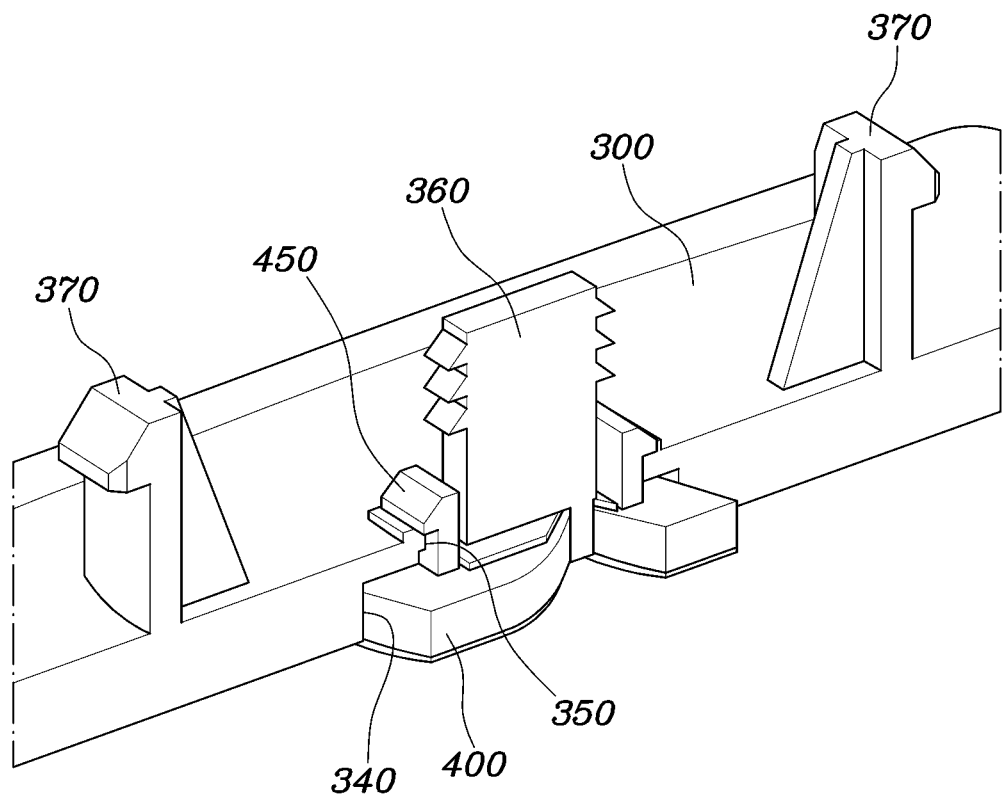
FIG. 16 is a view illustrating the rear shape of the emblem assembly illustrated in FIG. 13.

Meanwhile, FIG. 15 is an exploded view illustrating an emblem logo 400 and an emblem body 300 according to a third form of an emblem assembly according to the present disclosure, and FIG. 16 is a view illustrating the rear shape of the emblem assembly illustrated in FIG. 13.

Referring to the drawings, the emblem logo 400 is coupled to the emblem body 300 by a hook coupling structure; a logo insertion recess 340 is formed in the emblem body 300; and the emblem logo 400 is inserted into the logo insertion recess 340 to be exposed from the surface of the emblem body 300.

For example, the logo insertion recess 340 is formed at the center of the emblem body 300 in a logo shape, and the emblem logo 400 is formed in a shape corresponding to the logo insertion recess 340. Thus, the emblem logo 400 is inserted into the logo insertion recess 340 from a front surface of the logo insertion recess 340, so that the emblem logo 400 is exposed from the surface of the emblem body 300.

In addition, the hook coupling structure applied to the third form of the emblem assembly will be described. The hook coupling structure includes a logo hook 450 formed on each side of a rear surface of the emblem logo 400; and a body hooking hole 350 formed on each side of the logo insertion recess 340, so that the respective logo hooks 450 are hooked and coupled to the respective body hooking holes 350.

That is, the logo hooks 450 are formed in a hook shape on opposite sides of the rear surface of the emblem logo 400, and the body hooking holes 350 are formed in the logo insertion recess 340 at positions corresponding to the logo hooks 450, so that the logo hooks 450 are respectively hooked and coupled to the body hooking holes 350 by being inserted thereinto, thereby coupling the emblem logo 400 to the emblem body 300.

In addition, a double-sided tape 500 may be adhered between the rear surface of the emblem logo 400 and the logo insertion recess 340.

That is, a front surface of the double-sided tape 500 is adhered to the rear surface of the emblem logo 400, and a rear surface of the double-sided tape 500 is adhered to the front surface of the logo insertion recess 340, so that the emblem logo 400 is adhered to the emblem body 300, and in particular, it is possible to further improve coupling force between the emblem logo 400 and the emblem body 300 through the hook coupling structure in conjunction with such an adhesive structure.

Figure 17:
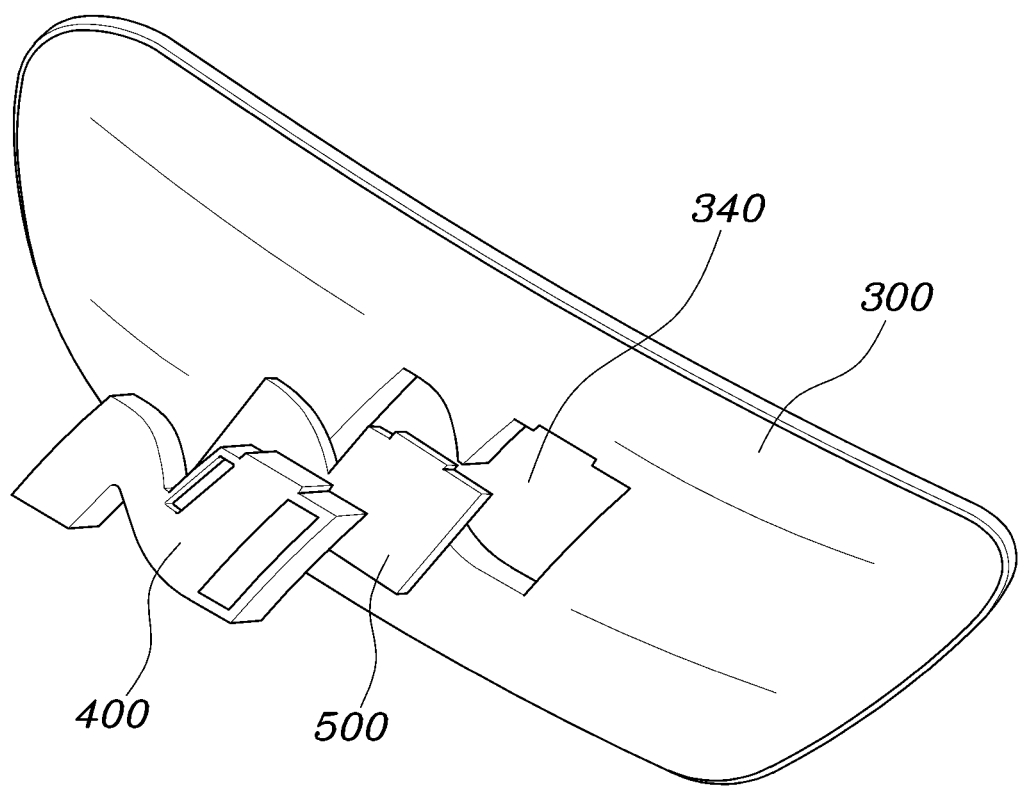
FIG. 17 is an exploded view illustrating an emblem logo and an emblem body according to a fourth form of an emblem assembly according to the present disclosure.

Meanwhile, FIG. 17 is an exploded view illustrating an emblem logo 400 and an emblem body 300 according to a fourth form of an emblem assembly according to the present disclosure.

Referring to the drawings, a logo insertion recess 340 is formed at the center of a front surface of the emblem body 300; the emblem logo 400 is inserted into the logo insertion recess 340; and a double-sided tape 500 is adhered between the emblem logo 400 and the logo insertion recess 340.

Preferably, the edge of the double-sided tape 500 is formed in a size corresponding to that of the emblem logo 400.

Thus, a front surface of the double-sided tape 500 is adhered to the rear surface of the emblem logo 400, and a rear surface of the double-sided tape 500 is adhered to the front surface of the logo insertion recess 340, so that the emblem logo 400 is adhered to the emblem body 300, and in particular, it is possible to further improve coupling force between the emblem logo 400 and the emblem body 300 through the hook coupling structure in conjunction with such an adhesive structure.

Figure 18:
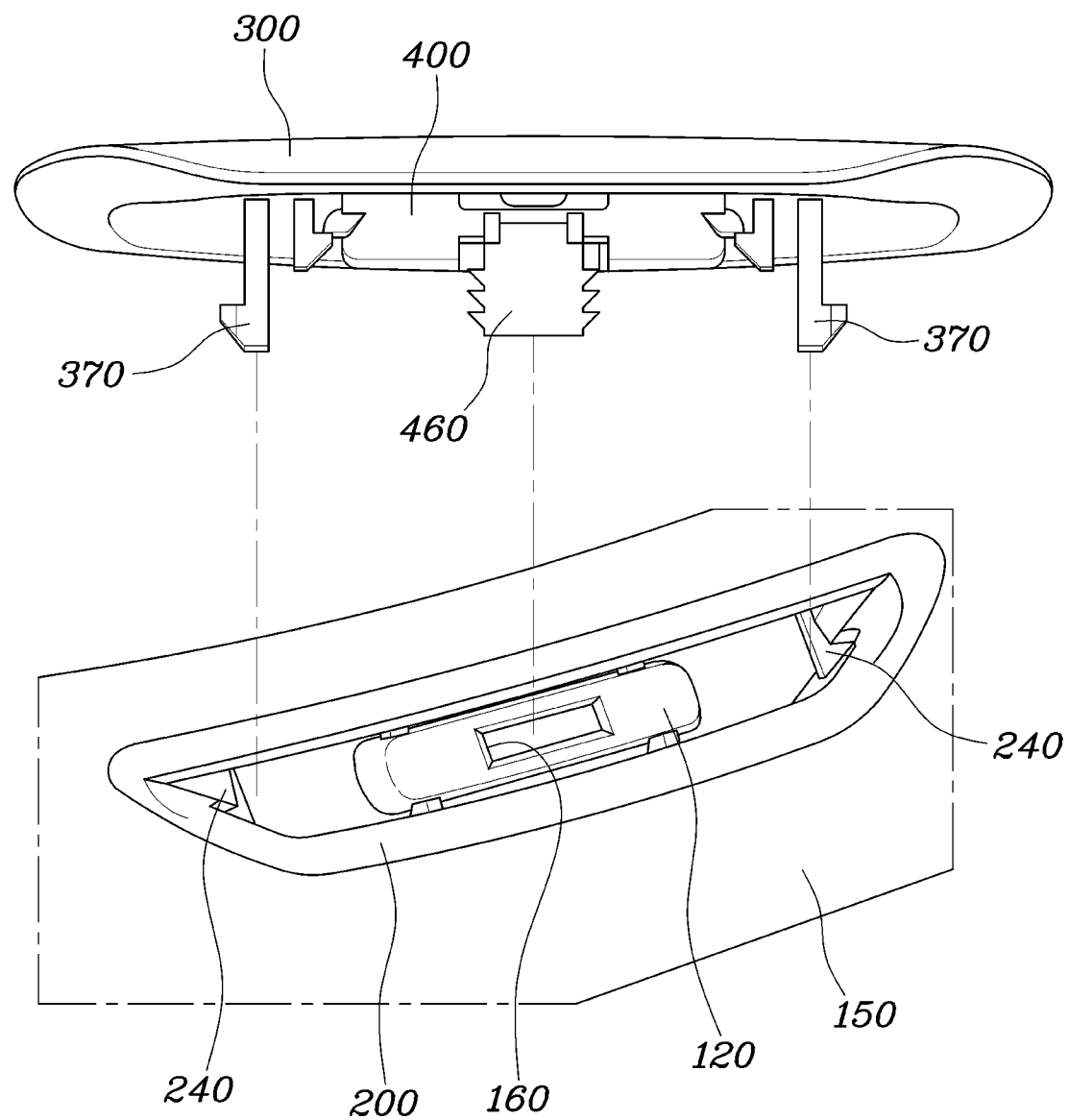
FIG. 18 is a view illustrating a state before coupling of the emblem assembly and the emblem bracket according to one form of the present disclosure.

Meanwhile, FIG. 18 is a view illustrating a state before coupling of the emblem assembly and the emblem bracket 200 according to one form of the present disclosure.

Referring to FIG. 18 in conjunction with FIG. 7, the center support 150 is formed to protrude from the center of the coupling groove 130; a center hooking hole 160 is formed at the center of the center support 150; and a center hook 360 or 460 is formed on a rear surface of the emblem assembly to be coupled to the center hooking hole 160.

In addition, the center hook 360 or 460 may have opposite portions formed in a serrated shape.

In addition, the center hook 360 or 460 may be formed on the emblem logo 400 or the emblem body 300.

For example, in the case of the first and second forms of the emblem assembly, since the emblem logo 400 is coupled to the emblem body 300 on the rear surface of the emblem body 300, the center hook 460 may be formed at the center of the rear surface of the emblem logo 400.

On the other hand, in the case of the third and fourth forms of the emblem assembly, since the emblem logo 400 is fixed to the emblem body 300 on the front surface of the emblem body 300, the center hook 360 may be formed at the center of the rear surface of the emblem body 300.

That is, a rectangular center hooking hole 160 is formed at the center of the center support 150, and the center hook 360 or 460 is formed at the center of the rear surface of the emblem logo 400 or the emblem body 300.

Thus, when inserting the emblem assembly into the coupling groove 130, as the center hook 360 or 460 is inserted into the center hooking hole 160, the opposite serrated portions of the center hook 360 or 460 are caught on opposite inner surfaces of the center hooking hole 160, thereby coupling the emblem assembly to the grip body 120.

In addition, a bracket hook 240 is formed on each side of an inner surface of the emblem bracket 200; and a side hook 370 is formed on each side of the rear surface of the emblem body 300 to be hooked and coupled to the bracket hook 240.

That is, the respective side hooks 370 formed on the emblem body 300 are hooked and coupled to the respective bracket hooks 240 formed on the emblem bracket 200, so that the emblem body 300 is coupled to the emblem bracket 200.

As such, by coupling the emblem body 300 to the emblem bracket 200 by a coupling structure of the side hooks 370 and the bracket hooks 240, and at the same time by coupling the emblem assembly to the grip body 120 by a coupling structure between the center hook 360 or 460 and the center hooking hole 160, it is possible to further improve coupling force of the emblem assembly coupled to the steering wheel 10.

Meanwhile, in the present disclosure, the edge of the surface of the emblem body 300 may match the edge of the coupling groove 130.

That is, as illustrated in FIG. 1, the edge of the coupling groove 130 and the edge of the emblem assembly are coupled to each other without a height difference therebetween, and the surface of the emblem body 300 is formed in a curved shape that is continuously connected to the surface of the grip body 120 connected thereto. This thus provides a sense of unity between the emblem and the outer surface of the grip body 120, thereby maintaining unity in terms of design.

As described above, in the present disclosure, by coupling the emblem bracket 200 to the steering wheel 10, and by coupling the emblem assembly, in which the emblem logo 400 and the emblem body 300 are coupled, into the emblem bracket 200, the emblem can be firmly fixed to the steering wheel 10. Thus, it is possible to provide robustness of the emblem fixing structure by improving coupling force of the emblem, thereby inhibiting the emblem from being separated, as well as reducing movement of the emblem to improve quality of a product.

In addition, by configuring the emblem assembly to have a two-piece structure of the emblem logo 400 and the emblem body 300, it is possible to change the logo's color or design only by replacing the emblem logo 400, thereby providing the degree of freedom in terms of logo design.

In addition, by fixing the emblem to the curved steering wheel 10, it is possible to provide a sense of unity between an end surface of the grip body 120 and an outer surface of the emblem, while forming a natural parting line along the edge of the emblem.

Although the specific form of the present disclosure has been described for illustrative purposes, those skilled in the art will appreciate that various modifications, additions and substitutions are possible, without departing from the scope and spirit of the present disclosure.

What is claimed is:

1. An emblem for a steering wheel, the emblem comprising:
   a rim of the steering wheel, the rim including a coupling groove formed in an outer surface thereof;
   an emblem bracket coupled into the coupling groove; and
   an emblem assembly including an emblem body, an emblem logo, and a logo portion formed on the emblem logo,
   wherein the emblem assembly is fastened into the emblem bracket in a state in which the logo portion is exposed from a surface of the emblem body,
   wherein:
     the rim comprises: an armature provided therein, and a grip body configured to surround the armature;
     the coupling groove is formed in the grip body; and
     a portion of the armature is formed in a cut-out groove shape and forms a space for the coupling groove to be located therein.

2. The emblem of claim 1, further comprising:
   a bracket stopper formed to protrude from an outer surface of the emblem bracket; and
   a bracket stopping recess formed in an inner surface of the coupling groove at a position corresponding to the bracket stopper,
   wherein the bracket stopper is coupled to the bracket stopping recess.

3. The emblem of claim 2, further comprising:
   a first stopping recess formed on a first side of the inner surface of the coupling groove;
   a first stopper formed on a side surface of the emblem bracket, wherein the first stopper is coupled to the first stopping recess;
   a second stopping recess formed on a second side of the inner surface of the coupling groove; and
   a second stopper formed on a bottom surface of the emblem bracket, wherein the second stopper is coupled to the second stopping recess, wherein the first stopper and the second stopper have a height difference therebetween.

4. The emblem of claim 1, further comprising:
a center support formed to protrude from a center of the coupling groove;
a center hole formed at a center of the emblem bracket and configured to be fitted over the center support; and
a support protrusion formed on an inner surface of the center hole and configured to be supported on an outer surface of the center support.

5. The emblem of claim 1, further comprising:
a hook coupling structure configured to couple the emblem logo to a rear surface of the emblem body; and
a logo insertion hole formed in the emblem body;
wherein the logo portion is embossed on the emblem logo, and is configured to be inserted into the logo insertion hole and to be exposed from the surface of the emblem body.

6. The emblem of claim 5, further comprising: a fusion hole formed on an edge of the emblem logo; and
a fusion protrusion formed on the emblem body at a position corresponding to the fusion hole,
wherein the fusion protrusion is fused and joined in the fusion hole.

7. The emblem of claim 5, wherein the hook coupling structure comprises:
a logo stopper formed on each a first side and a second side of the emblem logo; and
a body hook formed on each a first side and a second side of the emblem body, wherein the body hook is hooked and coupled to the respective logo stopper.

8. The emblem of claim 5, wherein the hook coupling structure comprises:
a logo hooking hole formed on each a first side and a second side of the emblem logo; and
a body hook formed on each a first side and a second side of the emblem body,
wherein the body hook is coupled to the respective logo hooking hole.

9. The emblem of claim 5, further comprising a double-sided tape adhered between a front surface of the emblem logo except for the logo portion and the rear surface of the emblem body.

10. The emblem of claim 1, further comprising:
a hook coupling structure configured to couple the emblem logo to the emblem body; and
a logo insertion recess formed in the emblem body,
wherein the emblem logo is inserted into the logo insertion recess and is exposed from the surface of the emblem body.

11. The emblem of claim 10, wherein the hook coupling structure comprises:
a logo hook formed on each a first side and a second side of a rear surface of the emblem logo; and
a body hooking hole formed on each a first side and a second side of the logo insertion recess, wherein the logo hook is hooked and coupled to the respective body hooking hole.

12. The emblem of claim 10, further comprising a double-sided tape adhered between a rear surface of the emblem logo and the logo insertion recess.

13. The emblem of claim 1, further comprising:
a logo insertion recess formed on a front surface of the emblem body, wherein the emblem logo is inserted into the logo insertion recess; and
a double-sided tape adhered between the emblem logo and the logo insertion recess.

14. The emblem of claim 1, further comprising:
a center support formed to protrude from a center of the coupling groove;
a center hooking hole formed at a center of the center support; and
a center hook formed on a rear surface of the emblem assembly and coupled to the center hooking hole.

15. The emblem of claim 14, wherein the center hook is formed on the emblem logo or on the emblem body.

16. The emblem of claim 14, wherein:
the center hook includes a first portion and a second portion that are opposite to each other, and
the first and second portions are formed in a serrated shape.

17. The emblem of claim 1, further comprising:
a bracket hook formed on each a first side and a second side of an inner surface of the emblem bracket; and
a side hook formed on each a first side and a second side of a rear surface of the emblem body and configured to be hooked and coupled to the bracket hook.

18. The emblem of claim 1, wherein an edge of a surface of the emblem body matches an edge of the coupling groove.

19. An emblem for a steering wheel, the emblem comprising:
a rim of the steering wheel, the rim including a coupling groove formed in an outer surface thereof;
an emblem bracket coupled into the coupling groove;
an emblem assembly including an emblem body, an emblem logo, and a logo portion formed on the emblem logo,
wherein the emblem assembly is fastened into the emblem bracket in a state in which the logo portion is exposed from a surface of the emblem body,
a logo insertion recess formed on a front surface of the emblem body, wherein the emblem logo is inserted into the logo insertion recess; and
a double-sided tape adhered between the emblem logo and the logo insertion recess.

20. An emblem for a steering wheel, the emblem comprising:
a rim of the steering wheel, the rim including a coupling groove formed in an outer surface thereof;
an emblem bracket coupled into the coupling groove;
an emblem assembly including an emblem body, an emblem logo, and a logo portion formed on the emblem logo,
wherein the emblem assembly is fastened into the emblem bracket in a state in which the logo portion is exposed from a surface of the emblem body,
a bracket hook formed on each a first side and a second side of an inner surface of the emblem bracket; and
a side hook formed on each a first side and a second side of a rear surface of the emblem body and configured to be hooked and coupled to the bracket hook.

* * * * *